United States Patent [19]
Reed

[11] Patent Number: 5,243,779
[45] Date of Patent: Sep. 14, 1993

[54] FISHING SINKERS, SNAGLESS, NON-TOXIC, BIODEGRADABLE

[76] Inventor: Oren O. Reed, P.O. 132, Jenner, Calif. 95450

[21] Appl. No.: 896,761

[22] Filed: Jun. 8, 1992

[51] Int. Cl.$^5$ .............................. A01K 91/00
[52] U.S. Cl. ..................... 43/43.12; 43/43.14
[58] Field of Search ............ 43/43.1, 43.12, 43.14

[56] References Cited

U.S. PATENT DOCUMENTS

| | | | |
|---|---|---|---|
| 2,308,238 | 1/1943 | Baker | 43/43.12 |
| 3,600,002 | 6/1952 | Klein | 43/42.39 |
| 3,854,235 | 12/1974 | Thompson | 43/43.12 |
| 3,999,326 | 12/1976 | Wolf | 43/43.81 |
| 4,077,151 | 3/1978 | Johnson | 43/43.12 |
| 4,530,180 | 7/1985 | Gwaldacz, Sr. et al. | 43/44.81 |
| 4,663,881 | 5/1987 | Follett | 43/43.12 |
| 4,753,030 | 6/1988 | Ziglinski | 43/43.12 |
| 4,796,377 | 1/1989 | Hosegood et al. | 43/43.1 |

FOREIGN PATENT DOCUMENTS 2207841 2/1989 United Kingdom ............ 43/44.81

OTHER PUBLICATIONS

Gary LaFontaine, "The Slinky Rig for Steelhead and Trout", Fly Fishing Quarterly 1992 Spring, p. 50.
Slinky Drifter tm trial-pac, ad S.T.S. magazine, Jan. 92 p. 58.
Slinky Drifter tm kit-pac, purchased Longs Drug, Jan. 92.
Slinker c pre-made, purchased Payless, Jan. 92.
Riversnake tm Slinkie kit, Purchased Payless, Jan. 92.

*Primary Examiner*—Mark Rosenbaum
*Assistant Examiner*—Chuck Y. Mah

[57] ABSTRACT

An improved snagless fishing sinker having a row of non-toxic biodegradable metal balls (6) surrounded and encased by a non-toxic biodegradable woven sleeve (4) and contained by an overhand knot (10b) in a supple sinker configuration (22). Hand assembled by inserting a row of balls (6) into a woven sleeve (4) until a desired aggregate weight is achieved. Contained by an overhand knot (10b) at each end, with a little slack in the sleeve (4) to allow for a supple configuration, and cut free from remaining sleeve (4) with cut ends (8) extending and remaining to prevent knots loosening. Humans and environment can benefit from the easy to use, all around snagless sinker (22) that is safe in the home and environment.

3 Claims, 1 Drawing Sheet

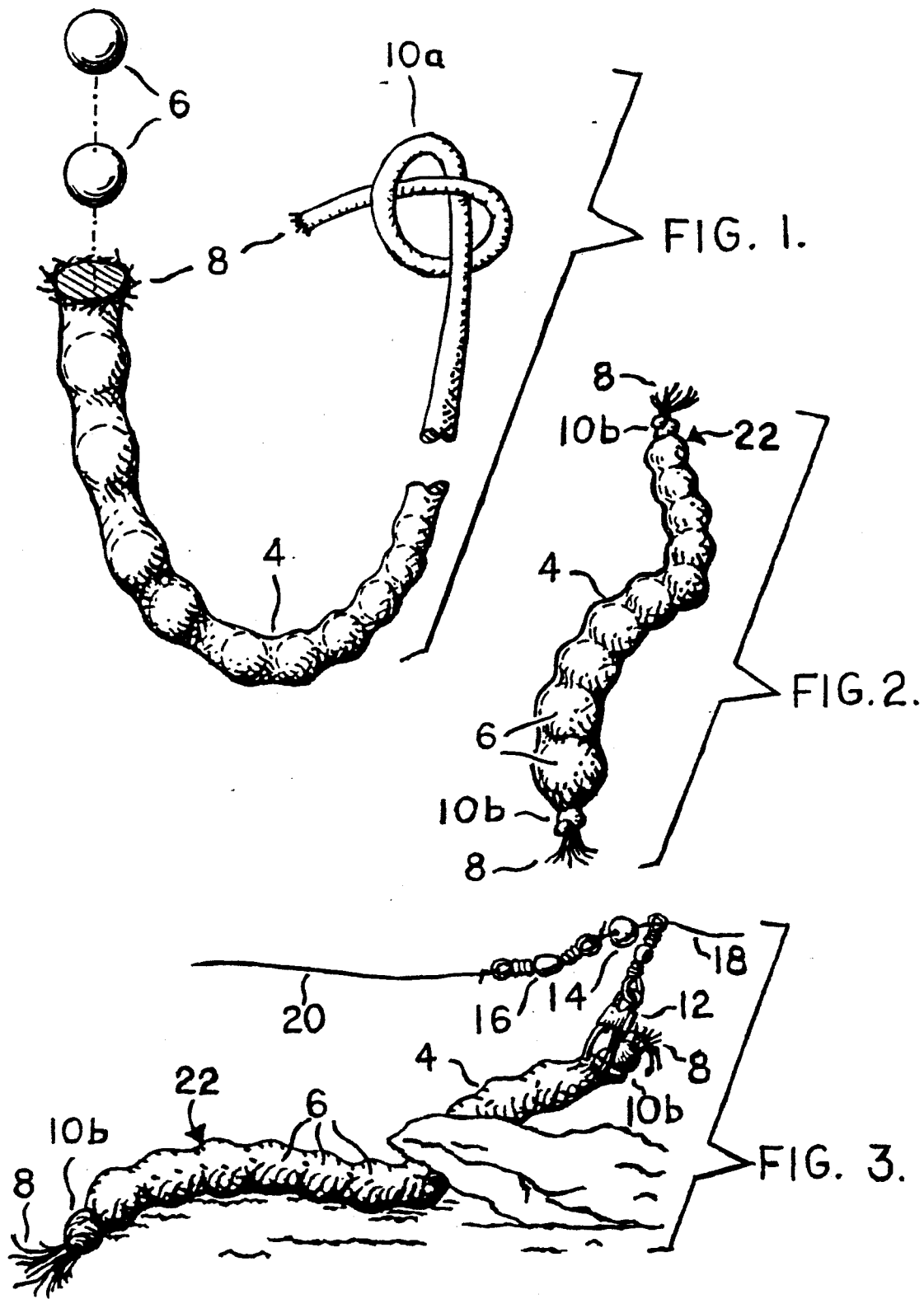

FISHING SINKERS, SNAGLESS, NON-TOXIC, BIODEGRADABLE

BACKGROUND OF INVENTION

This invention relates to fishing sinkers, specifically to an existing ball and sleeve snagless design that can be made nontoxic and biodegradable.

DESCRIPTION OF PRIOR ART

Heretofore all patented fishing sinker configurations had a marked degree of rigidity. Rigidity is usually the main cause of sinker snagging and subsequent loss. This rigidity is usually due to the use of solid metal. No prior patents art in any way resembles or comes close to the invention. All used solid metal, usually lead. Lead is a soft, malleable, ductile, dense metallic element, that is not supple, but is toxic.

Although this problem of snagging has been lessened some with the manufacture of unpatented snagless ball and sleeve designs that are supple, such as "SLINKY DRIFTER" tm by P.R.E., "RIVERSNAKE SLINKIE" by Rainbow Tackle Co., and "SLINKER" by Northwest Tackle Mfg., these sinkers using the ball and sleeve concept all suffer a number of disadvantages.

(a) They all use lead, a known toxic substance. Federal regulations require this warning to be placed on all products containing lead : WARNING: Contains lead. A substance known to cause birth defects or other reproductive harm. Do not eat, drink or smoke while using. Wash hands after use. Do not re-use container. "Keep out of reach of children".

(b) They all use nylon or synthetic fabric that is non-biodegradable.

(c) The nylon or synthetic is melted with a flame, and then pressed together with a tool to make a closure. This releases toxic fumes, and is a hidden burn hazard. The molten nylon ignites and burns almost invisably.

(d) Home assembly using tools is tedious and required in advance of fishing.

(e) On the spot weight adjustment of factory pre-made sinkers and those which are pre-made at home is difficult.

(f) Some loss of these sinkers is still an inevitable part of fishing. Therefore a toxic substance (lead) is joined by a nonbiodegradable substance (nylon) in the environment.

Loss of one of these fishing sinkers while fishing causes a toxic substance along with a non-biodegradable substance to be placed in a usually irretrievable position in the environment. This compounds an already serious problem of commonly used lead fishing sinkers of all shapes and sizes snagging and being lost. These substances are ground up in rivers and streams during high water conditions, and deposited in many areas of lesser turbulence.

Documentation exists showing that birds and fish eat the small bits of lead (especially lead shot), and die or suffer reproductive problems. The worst possible shape for lead when ingested is a smooth ball. That documentation is available from the U.S. Department of the Interior, Fish and Wildlife Service, Patuxent Wildlife Reasearch Center, Laurel, Md. 20708. Titled: LEAD HAZARDS TO FISH, WILDLIFE, AND INVERTEBRATES: A SYNOPTIC REVIEW. by Ronald Eisler. 1988.

Lead has been banned as fishing sinkers in England due to a loss of swans. Lead has been banned in the U.S. as shot in shotguns due to the loss of waterfowl, raptors, and other scavenging animals. Soft carbon steel shot is now used in the U.S. manufacture of shotgun shells because it is nontoxic and will biodegrade rapidly within three years in the environment.

Use of lead as fishing sinkers has dire consequences when children accidentaly swallow small pieces or balls. Many anglers make their own sinkers at home by melting lead and pouring it into molds, further compounding exposure to a toxic substance. A substance now characterized by the Environmental Protection Agency as a neuro-toxin that especially affects children at very low exposure levels. Levels that were considered safe a few years ago have been reduced recently by 40%.

Further objects and advantages of my invention will become apparent from a consideration of the drawings and ensuing description of it.

DRAWING FIGURES

FIG. 1 is an exploded broken perspective view showing how the sinker is assembled, and its relevant parts.

FIG. 2 is a perspective view showing the assembled sinker of FIG. 1.

FIG. 3 is a perspective view showing the sinker in use, and its attachments.

| Reference Numerals in Drawings | | | |
|---|---|---|---|
| 4 | woven sleeve | 6 | metal balls |
| 8 | cut end | 10a | loose overhand knot |
| 10b | tight overhand knot | 12 | snap swivel |
| 14 | bead | 16 | barrel swivel |
| 18 | main line | 20 | line to hook or lure |
| 22 | sinker | | |

DETAILED DESCRIPTION

A typical embodiment of the fishing sinker of the present invention is illustrated in FIG. 1, perspective view of assembly and relevant parts, and FIG. 2, completed assembly.

The sinker has a length of woven sleeve 4 consisting of an organic fabric with a nap. A row of metal balls 6 consisting of nontoxic biodegradable composition, is inserted into sleeve 4 in series. An overhand knot 10a, 10b is tied at each end of sleeve 4 to secure balls 6 internally. Sinker 22 in FIG. 2 is then cut free from remaining sleeve 4.In the prefered embodiment the woven sleeve is a cotton shoelace such as style 4420 available from Mitchellace Inc., Portsmouth, Ohio. However this sleeve can consist of any nontoxic biodegradable fabric with a nap and a weave of sufficient tightness to inhibit migration of balls through the sleeve walls during use. Metal balls are such as 5.588 mm soft carbon steel shot called "ECO-SHOT" tm available from Hoover Group, Steel Reloading Components Inc., Washington, In.. However these metal balls can consist of any non-toxic biodegradable metal with sufficient density to sink rapidly in water.

The relationship between the size of sleeve, the type of weave, and the size of balls is critical in order to provide adjustability and ease of assembly. This relationship is discussed with more detail in the Operation section.The inside diameter of the sleeve will be smaller than the outside diameter of the balls. However the balls must slide easily by hand into the sleeve.

Cut end 8 of woven sleeve 4 is manipulated to stay open and form a slight funnel shape to facilitate insertion of metal balls 6. Metal balls 6 are inserted in series and pulled into sleeve 4 one or two at a time until a desired aggregate weight is achieved. A overhand knot 10a, 10b is tied at the insertion end of sleeve 4 with a portion of cut end 8 extending and remaining. Metal balls 6 are then pulled in reverse order to insertion, until they encounter knot 10b. Knot 10b is again tied behind the row of balls with enough slack to facilitate suppleness of the overall sinker 22 configuration. The remainder of the woven sleeve 4 is then cut free from the sinker 22 with a portion of the cut end 8 extending and remaining. That end portion should at a minimum be equal to the width of the sleeve. This cut end dimension extending beyond the knots will prevent loosening of the knots while sinker 22 is in use. Sinker 22 assembled to be supple will be snagless when rigged as in the preferred embodiment shown in FIG. 3.

OPERATION

FIG. 3. shows a prefered embodiment of sinker 22 assembled and in use. Attachments are shown only to assist understanding. Attachments consist of a snap swivel 12 attached to one end. Each end is exactly alike, so there is no difference as to which end is selected. Snap swivel 12 is opened and worked through a portion of woven sleeve 4 that is between balls 6 and knot 10b and then closed. The sinker and snap swivel are attached to a main line 18 by sliding snap swivel 12 onto main line 18 followed by a bead 14 that prevents the swivel eyes from jamming together, then the main line is tied to a barrel swivel 16. A line to hook or lure 20 is then tied to the other end of barrel swivel 16.

This is a popular manner of rigging fishing sinkers, and is called a 'slip sinker' rig, because the main line to the angler slips through the attachment when a fish bites. This allows the angler to feel the lightest tap or see the line move, without the fish feeling the weight of the sinker on the line.

For a fishing sinker to be snagless it is required that it move along the stream bottom in a dynamic rather than rigid manner. A dynamic sinker is one that is supple. The snagless feature of the sinker comes from suppleness derived when used longitudinally with a connection only at one end. This suppleness is a result of the relationship between the physical properties of the components and their dimensions. The most critical relationship is dimensional. A secondary relationship is in the physical properties of the individual components as they interact within the tight dimensional specifications. Dimensional specifications require that the balls must slide easily into the first inside diameter of the sleeve, but must not be able to pass each other within that sleeve. Therefore the second inside diameter of the sleeve when compressed must be less than the doubled common diameter of the balls. The weave of the sleeve must be loose enough to permit the escapement of air and the entrance of water, but must be tight enough to inhibit escapement of balls while in use. However should the angler wish to reduce the sinker weight while in use, the balls can be manipulated through the weave with a little persistance.

Dimensions of the prefered embodiment shown are : Steel balls 5.588 mm in diameter weighing 0.727 grams each, inserted internally into a woven cotton sleeve (shoelace material) of 5 mm inside diameter and ½ mm wall thickness. If ten of these balls were to be used, the aggregate weight would be charted as ¼ ounce.

These dimensional specifications are joined by the dynamics of the smooth hard surface of the balls in contact with the nap of the sleeve fabric. I believe the nap assists the interior movement of the balls during assembly when dry, yet inhibits movement during use when wet. This might best be understood if related to the untying of wet cotton shoelaces. The wet nap creates much stronger static resistance. However I do not wish to be bound by this.

SUMMARY OF THE INVENTION

Accordingly the reader will see that the fishing sinker maintains a suppleness that has already been shown desirable by anglers. The fishing sinker can be made in many lengths, widths, and weights. Eg: Steel balls 9.525 mm in diameter weighing 4.34 grams each inserted into a woven cotton sleeve until the number thirteen is acquired, would be charted as 2 ounces approximate Steel balls 25.4 mm in diameter weighing 68.72 grams each inserted into a woven cotton sleeve until the number thirteen is acquired, would be charted as two pounds approximate.

The sinker provides additional advantages in that
  it permits humans and environment a nontoxic biodegradable alternative to lead;
  it permits a nontoxic biodegradable alternative to nylon or synthetic fabric;
  it permits a closure that is easy, safe, and nontoxic;
  it permits on the spot assembly;
  it permits adjustability while useing.

An added note that cotton shoelaces have been doing the job on shoes extremely well for many years, and the performance quality of an overhand knot has been known for centuries.

Although the description above contains many specificities, these should not be construed as limiting the scope of the invention but as merely providing illustrations of some of the presently prefered embodiments of this invention.

Thus the scope of the invention should be determined by the appended claims and their legal equivalents, rather than by the examples given.

I claim:

1. A method of manufacturing a fishing sinker, comprising the steps of:
   (a) providing a sleeve of organic, nontoxic, biodegradable woven material having two ends, and a plurality of nontoxic, biodegradable metal balls;
   (b) tying a first tight overhand-knot with said sleeve at one end to form a first end closure;
   (c) inserting said metal balls, in series, into the other end of said sleeve;
   (d) pulling said metal balls inside of the sleeve until said balls lay in a supple row configuration with one end of the row against said first overhand-knot;
   (e) tying a second tight overhand-knot with the other end of said sleeve to form a second end closure, thereby sealing said balls in said sleeve; and wherein each end of said sleeve extends slightly beyond its respective overhand-knot to prevent the knots from loosening, and wherein said metal balls have a common diameter; said sleeve has an inside diameter less than the common diameter of said metal balls.

2. The method according to claim 1 wherein said sleeve is formed of cotton.

3. The method according to claim 1 wherein said metal balls are formed of soft carbon steel.

* * * * *